(12) United States Patent
Fukino

(10) Patent No.: US 12,511,098 B2
(45) Date of Patent: Dec. 30, 2025

(54) SOUND SIGNAL PROCESSING SYSTEM AND SOUND SIGNAL PROCESSING METHOD

(71) Applicant: Panasonic Intellectual Property Management Co., Ltd., Osaka (JP)

(72) Inventor: Miwa Fukino, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 239 days.

(21) Appl. No.: 18/046,062

(22) Filed: Oct. 12, 2022

(65) Prior Publication Data

US 2023/0057629 A1 Feb. 23, 2023

Related U.S. Application Data

(63) Continuation of application No. PCT/JP2021/027054, filed on Jul. 19, 2021.

(30) Foreign Application Priority Data

Sep. 8, 2020 (JP) ................. 2020-150215

(51) Int. Cl.
*G06F 3/16* (2006.01)
*G10K 15/02* (2006.01)

(52) U.S. Cl.
CPC ............. *G06F 3/165* (2013.01); *G10K 15/02* (2013.01)

(58) Field of Classification Search
CPC ............................ G06F 16/683; G06F 16/635
USPC ........................................................ 700/94
See application file for complete search history.

(56) References Cited

U.S. PATENT DOCUMENTS

| | | | |
|---|---|---|---|
| 10,573,312 B1* | 2/2020 | Thomson | G10L 15/22 |
| 11,133,023 B1* | 9/2021 | Hedgecock | G10L 25/51 |
| 11,562,761 B2* | 1/2023 | Liu | G10L 25/51 |
| 2020/0152216 A1* | 5/2020 | Shim | H04R 5/027 |
| 2020/0387267 A1* | 12/2020 | Fukino | G06F 3/0482 |
| 2020/0402525 A1* | 12/2020 | Daido | G10L 21/007 |
| 2022/0071535 A1* | 3/2022 | Jernigan | A61B 5/02405 |
| 2022/0116724 A1* | 4/2022 | Yamazaki | G06V 20/59 |
| 2022/0262363 A1* | 8/2022 | Sasaki | G10L 25/57 |

(Continued)

FOREIGN PATENT DOCUMENTS

JP 2019-168620 A 10/2019

OTHER PUBLICATIONS

International Search Report issued on Oct. 19, 2021 in International Patent Application No. PCT/JP2021/027054, with English translation.

(Continued)

*Primary Examiner* — Alexander Krzystan
(74) *Attorney, Agent, or Firm* — Rimon P.C.

(57) ABSTRACT

A sound signal processing system includes: a first obtainer that obtains recurrence plot information indicating a characteristic of a first sound; a second obtainer that obtains a sound signal of a second sound different from the first sound; a generator that generates a sound signal in which the characteristic of the first sound is reflected in the sound signal of the second sound, based on the recurrence plot information obtained by the first obtainer, the sound signal of the second sound being obtained by the second obtainer; and an outputter that outputs the sound signal generated.

8 Claims, 10 Drawing Sheets

(56) References Cited

U.S. PATENT DOCUMENTS

| | | | |
|---|---|---|---|
| 2023/0057629 A1* | 2/2023 | Fukino | G10K 15/02 |
| 2023/0290325 A1* | 9/2023 | Akimoto | G10G 1/00 |
| 2023/0421125 A1* | 12/2023 | Lee | G06F 16/65 |

OTHER PUBLICATIONS

Miwa Fukino, et al., "Coarse-graining time series data: Recurrence plot of recurrence plots and its application for music", Chaos: An Interdisciplinary Journal of Nonlinear Science, vol. 26, No. 2, Feb. 2016.

\* cited by examiner

Sine wave

White noise

FIG. 6
| UpperRP | 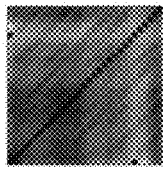 | 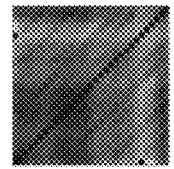 | --- |
|---|---|---|---|
| Subjective evaluation result (Kansei word) | Rough | Calm | --- |
| Sound signal of original nature sound | Sea sound 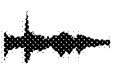 | River sound  | --- |

SOUND SIGNAL PROCESSING SYSTEM AND SOUND SIGNAL PROCESSING METHOD

CROSS REFERENCE TO RELATED APPLICATIONS

This is a continuation application of PCT International Application No. PCT/JP2021/027054 filed on Jul. 19, 2021, designating the United States of America, which is based on and claims priority of Japanese Patent Application No. 2020-150215 filed on Sep. 8, 2020. The entire disclosures of the above-identified applications, including the specifications, drawings and claims are incorporated herein by reference in their entirety.

FIELD

The present disclosure relates to a sound signal processing system and a sound signal processing method.

BACKGROUND

Various techniques have conventionally been proposed for sound signal processing. Patent Literature (PTL) 1 discloses a synthetic sound generation device capable of generating synthetic sound, the quality of which is prevented from deteriorating.

CITATION LIST

Patent Literature

PTL 1: Japanese Unexamined Patent Application Publication No. 2019-168620

Non Patent Literature

NPL 1: Fukino, Miwa, et al. "Coarse-Graining Time Series Data: Recurrence Plot of Recurrence Plots and Its Application for Music." Chaos: An Interdisciplinary Journal of Nonlinear Science, vol. 2, no. 26, 2016, pp. 0-12, doi: 10.1063/1.4941371.

SUMMARY

Technical Problem

The present disclosure provides a sound signal processing system capable of outputting a sound signal of a new sound in which a characteristic of a certain sound is reflected in another sound, and a sound signal processing method.

Solution to Problem

A sound signal processing system according to an aspect of the present disclosure includes: a first obtainer that obtains recurrence plot information indicating a characteristic of a first sound; a second obtainer that obtains a sound signal of a second sound different from the first sound; a generator that generates a sound signal in which the characteristic of the first sound is reflected in the sound signal of the second sound, based on the recurrence plot information obtained by the first obtainer, the sound signal of the second sound being obtained by the second obtainer; and an outputter that outputs the sound signal generated.

Advantageous Effects

According to a sound signal processing system and a sound signal processing method which relate to an aspect of the present disclosure, a sound signal of a new sound in which a characteristic of a certain sound is reflected in another sound can be outputted.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is a diagram showing the UpperRP stored in a storage.

DESCRIPTION OF EMBODIMENTS

Hereinafter, embodiments are specifically described, with reference to the drawings. It should be noted that each of the embodiments described below shows a comprehensive example or a specific example. A numerical value, a shape, a material, a structural component, an arrangement position of the structural component, a connection form of the structural components, a step, an order of the steps, and so on described in the below embodiments are examples, and are not intended to limit the present disclosure. Structural components that are not recited in independent claims among structural components described in the embodiments below will be described as optional structural components.

It should be noted that each drawing is a schematic diagram, and thus is not strictly illustrated. In addition, substantially the same configurations are allocated by the same reference sign, and the duplicate description may be omitted or simplified.

Embodiments

[Configuration]

Figure 1:
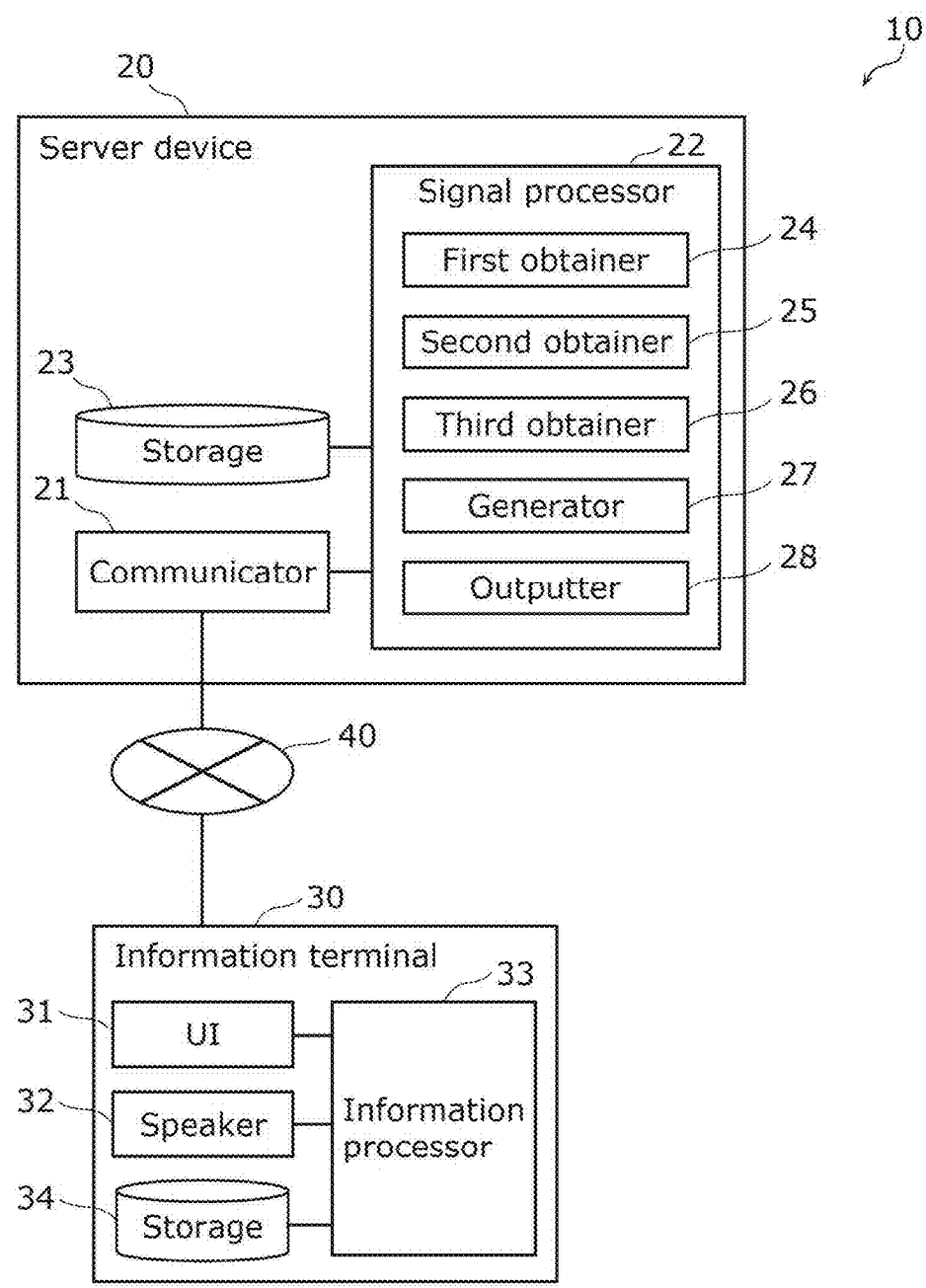
FIG. 1 is a block diagram showing a functionality configuration of a sound signal processing system according to an embodiment.

First, a configuration of a sound signal processing system according to an embodiment is described. FIG. 1 is a block diagram showing a functionality configuration of a sound signal processing system according to the embodiment.

As shown in FIG. 1, sound signal processing system 10 includes server device 20 and information terminal 30. Specifically, sound signal processing system 10 can reflect a characteristic of a certain nature sound (in other words, regularity) in another nature sound that a user desired, and output the thus generated sound. A nature sound means, specifically, a sound that is generated in nature, such as a sound of water, a sound of insects, an animal sound, and so on.

First, server device 20 is described. Server device 20 specifically includes communicator 21, signal processor 22, and storage 23.

Communicator 21 is a communication circuit (i.e., a communication module) for allowing server device 20 to communicate with information terminal 30 via wide area communication network 40, such as the Internet. A communication standard for the communication performed by communicator 21 is not particularly limited.

Signal processor 22 performs processing on a sound signal to generate a sound signal of a sound in which a characteristic of a nature sound is reflected in another nature sound desired by a user, and outputs the generated sound. Signal processor 22 is embodied by, for example, a microcomputer, but can be embodied by a processor, such as a digital signal processor (DSP) and so on. Signal processor 22 includes, as functional elements, first obtainer 24, second obtainer 25, third obtainer 26, generator 27, and outputter 28. A function of each of first obtainer 24, second obtainer 25, third obtainer 26, generator 27, and outputter 28 is embodied in a manner that a microcomputer or the like configuring signal processor 22 executes a computer program stored in storage 23. Detailed functions of these structural elements are described later.

Storage 23 is a storage device (memory) in which various information, a computer program, and so on, which are necessary for signal processor 22 to perform processing on a sound signal, are stored. Storage 23 is an example of a first storage and a second storage. Storage 23 is embodied by, for example, a hard disc drive (HDD), but may be embodied by a semiconductor memory.

Information terminal 30 is operated by a user for accessing server device 20. Information terminal 30 is, for example, a mobile information terminal including a laptop personal computer, a smartphone, a tablet terminal, and so on, and may be a stationary information terminal including a desktop personal computer, and so on. Information terminal 30 includes user interface (UI) 31, speaker 32, information processor 33, and storage 34.

UI 31 is a user interface device that accepts an operation by a user and presents an image to the user. UI 31 is embodied by an operation accepter including a touch panel, a keyboard, or the like, and a display including a display panel or the like.

Speaker 32 is a sound outputting device that reproduces a sound signal (i.e., outputs sound) that is provided from server device 20.

Information processor 33 performs information processing relating to display of an image in a display, output of a sound from speaker 32, and so on. Information processor 33 may be embodied by, for example, a microcomputer, but can be embodied by a processor. Functions of displaying an image and outputting a sound are embodied in a manner that a microcomputer or the like configuring information processor 33 executes a computer program stored in storage 34.

Storage 34 is a storage device (memory) in which various information, a computer program, and so on, which are necessary for performing processing on a sound signal by information processor 33. Storage 34 is embodied by, for example, a semiconductor memory.

[Recurrence Plot]

As described above, sound signal processing system 10 can reflect a characteristic of a certain nature sound in another nature sound desired by a user, and can output the thus generated sound. In sound signal processing system 10, a recurrence plot is used as means for performing processing on a sound signal, as described above.

The recurrence plot is one of nonlinear time series analyzing methods, and recurrence plot information obtained by the recurrence plot is expressed by a plan view. The recurrence plot information can be two-dimensional sequence information.

Figure 2:
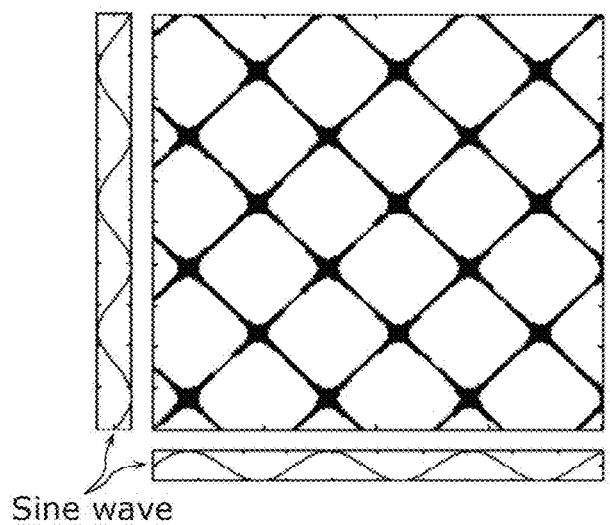
FIG. 2 is a diagram showing an example of recurrence plot information, when a sine wave is applied to a vertical axis and a horizontal axis.
Figure 3:
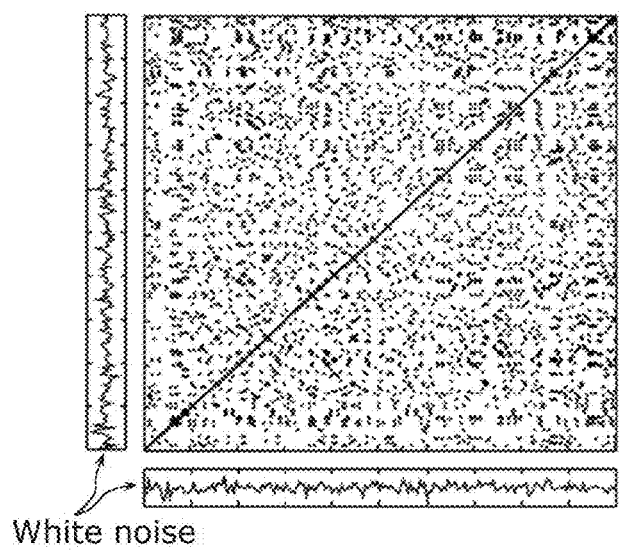
FIG. 3 is a diagram showing an example of the recurrence plot information, when a white noise is applied to the vertical axis and the horizontal axis.

In the recurrence plot, same time series data is applied to a vertical axis and a horizontal axis. A point is plotted at a place where a distance between two pieces of time series data is short (i.e., corresponding to 1 in a digital value), and a point is not plotted at a place where a distance between two pieces of time series data is far (i.e., corresponding to 0 in the digital value), so that the recurrence plot information is generated. Here, the distance can be defined by Euclidean distance, when the time series data is expressed by a vector (or by a scalar). FIG. 2 is a diagram showing an example of the recurrence plot information in a case where a sine wave is applied to the vertical axis and the horizontal axis. FIG. 3 is a diagram showing an example of the recurrence plot information in a case where a white noise is applied to the vertical axis and the horizontal axis. In FIGS. 2 and 3, black spots show that plotting was performed, whereas white areas show that no plotting was performed.

Figure 4:
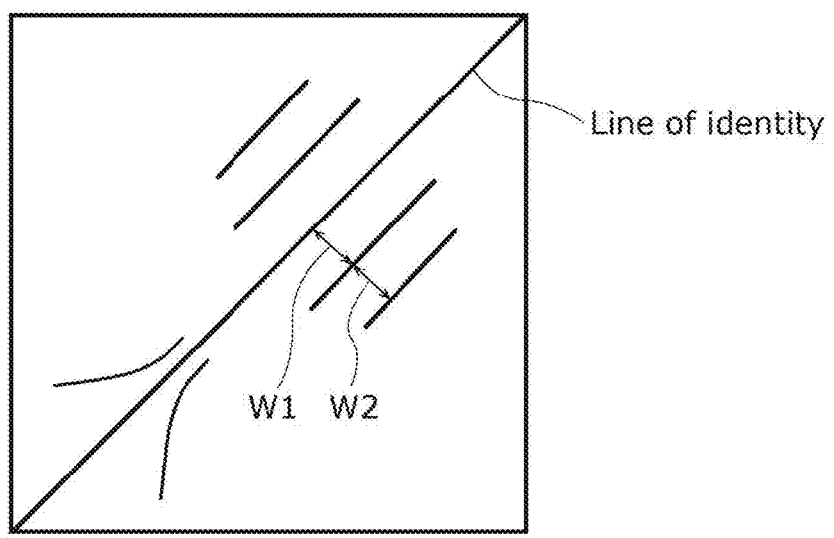
FIG. 4 is a diagram for describing a characteristic of time series data indicated by the recurrence plot information.

FIG. 4 is a diagram for describing a characteristic of time series data indicated by the recurrence plot information. The recurrence plot information indicates that periodicity exists in a case where lines are aligned in parallel to a line of identity. Distances to the line of identity (widths W1, W2, for example, in FIG. 4) indicate cycles.

The recurrence plot and a hierarchal recurrence plot are described, in detail, in NPL 1 (Fukino, Miwa, et al. "Coarse-Graining Time Series Data: Recurrence Plot of Recurrence Plots and Its Application for Music". Chaos: An Interdisciplinary Journal of Nonlinear Science, vol. 2, no. 26, 2016, pp. 0-12, doi: 0.1063/1.4941371). The content of NPL 1 is also contained in the present disclosure.

[Hierarchal Recurrence Plot]

Figure 5:
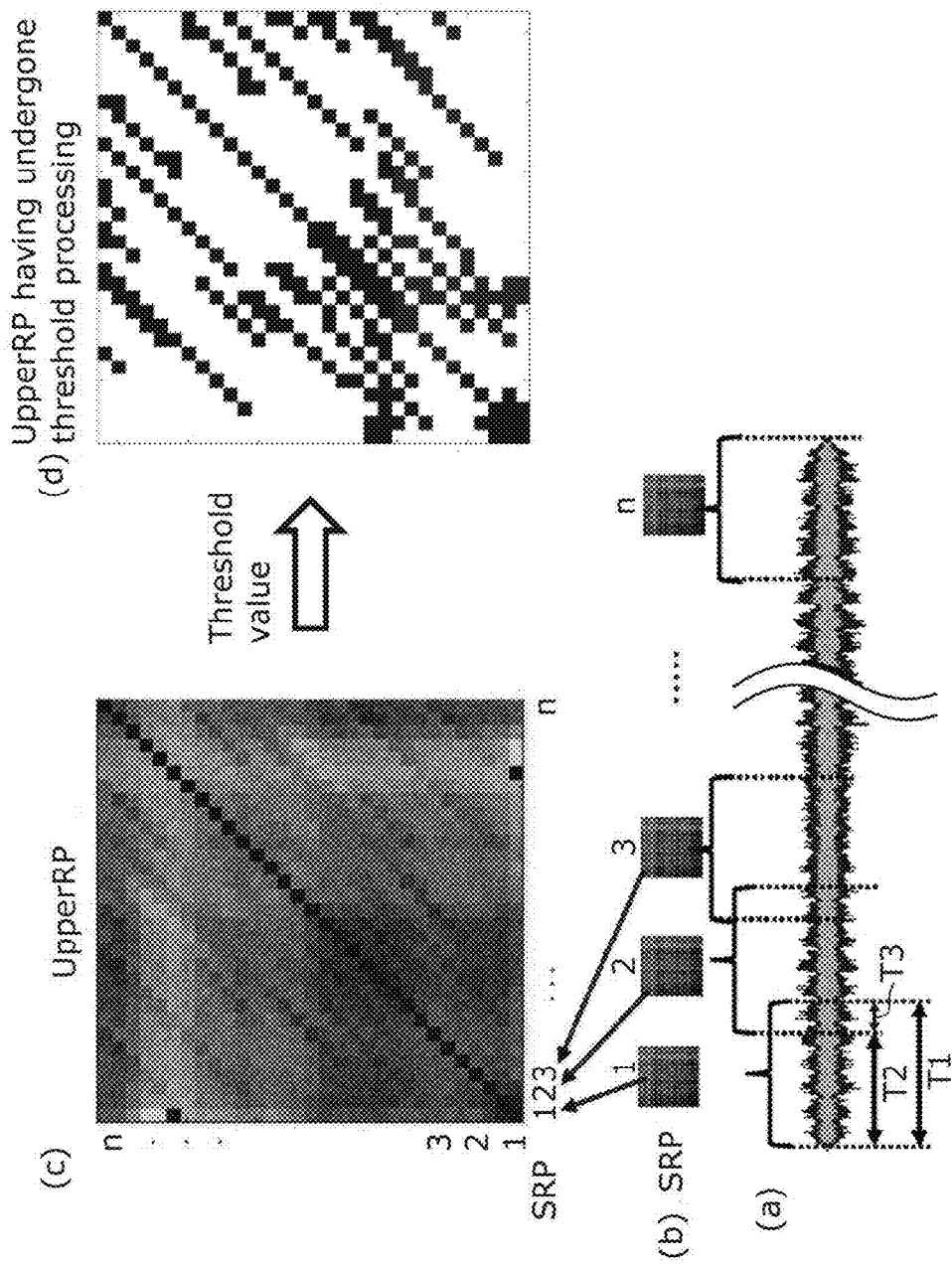
FIG. 5 is a diagram showing a method of generating UpperRP from a nature sound.

Sound signal processing system 10 uses an upper recurrence plot (UpperRP) that is the recurrence plot information obtained by the hierarchal recurrence plot, to reflect a characteristic of a certain nature sound in another nature sound desired by a user, and outputs the generated sound. The UpperRP is generated based on the certain nature sound (hereinafter, it is simply referred to as a nature sound). Hereinafter, a method of generating the UpperRP from the nature sound (an example of a first sound) is described. FIG. 5 is a diagram showing a method of generating the UpperRP from a nature sound. Although the description is provided based on the assumption that generator 27 of server device 20 performs processing of generating the UpperRP from the nature sound, the processing may be performed by a device other than server device 20. It is merely required that a plurality of pieces of UpperRP are stored in storage 23, at last.

First, generator 27 divides a sound signal of the nature sound (a time waveform of sound) into n processing units each of which is defined by window width T1 and shift width T2 ((a) of FIG. 5). Window width T1 is 2.0 sec, for example. Shift width T2 is 0.5 sec, for example. The number n of the processing units is a level of several tens to several hundreds, for example. Specific numeral values of window width T1, shift width T2, and the number n of the processing units are not limited, in particular.

Then, generator 27 generates short term RP (hereinafter, it is also referred to as SRP) from each of the n processing units ((b) of FIG. 5). For example, when time series data of a sound signal, which corresponds to a single processing unit, is applied to the vertical axis and the horizontal axis, and the ith state in the vertical axis (specifically, amplitude of the sound signal) is set as s(i), and the jth state in the horizontal axis is set as s(j), SRP (i, j)=d(s(i), s(j)) is established. It should be noted that 1≤j≤m (m is a natural number more than or equal to 2) is established. "d" is a function indicating a distance. For example, d=|s−s(j)|. As described above, SRP is matrix data composed of m×m elements, for example. In (b) of FIG. 5, the SRP is schematically illustrated with a grayscale.

Then, generator 27 applies n pieces of SRP generated respectively from the n processing units to each of the vertical axis and the horizontal axis, to generate UpperRP ((c) of FIG. 5). The UpperRP is n×n matrix data, for example. In (c) of FIG. 5, the UpperRP is schematically illustrated with the grayscale.

When the UpperRP is expressed as URP (i, j), URP (I, J)=D(SRP (i), SRP(j)) is established. It should be noted that 1≤j≤n (n is a natural number more than or equal to 2) is established. "D" is a function indicating a distance, and is a function for calculating a Euclidean distance between SRP and SRP (i.e., between matrices), for example.

It should also be noted that generator 27 performs threshold processing on UpperRP, so as to be able to generate the UpperRP having undergone the threshold processing ((d) of FIG. 5). When a value of each of n×n elements in original data of the UpperRP is less than a threshold value, signal processor 22 perform plotting on a position of each of the elements. When the value is equal to or more than the threshold value, signal processor 22 does not perform plotting on the corresponding position. With the processing, UpperRP that has undergone the threshold processing is generated.

[Association Between UpperRP and Characteristic of Sound]

Such UpperRP is stored in storage 23 of server device 20. FIG. 6 is a diagram showing UpperRP stored in storage 23. As shown in FIG. 6, a plurality of pieces of UpperRP are stored in storage 23, and each UpperRP is associated with a Kansei word (affective term) for a nature sound from which the UpperRP is originated. It should be noted that "Kansei" is a Japanese word including the meanings of "emotion", "affect", "feeling", "impression", "intuition", and so on. The "Kansei word" is a word for expressing impression for sound (e.g., a modifier), such as "rough", "calm", and so on, and is, in other word, an impression word. The Kansei word is defined based on results of subjective evaluations by a plurality of users who have listened to the nature sound (survey results of the plurality of users, or the like). It should be noted that only UpperRP originated from the nature sound determined as comfortable according to the survey results of the plurality of users may be stored.

In addition, as shown in FIG. 6, each of a plurality of pieces of UpperRP may be associated with a sound signal of the nature sound from which the UpperRP is originated. The duration of the sound signal is relatively short, and is a level of several seconds to ten seconds, for example.

[Sound Signal of Seed Sound]

Figures 7, 8:
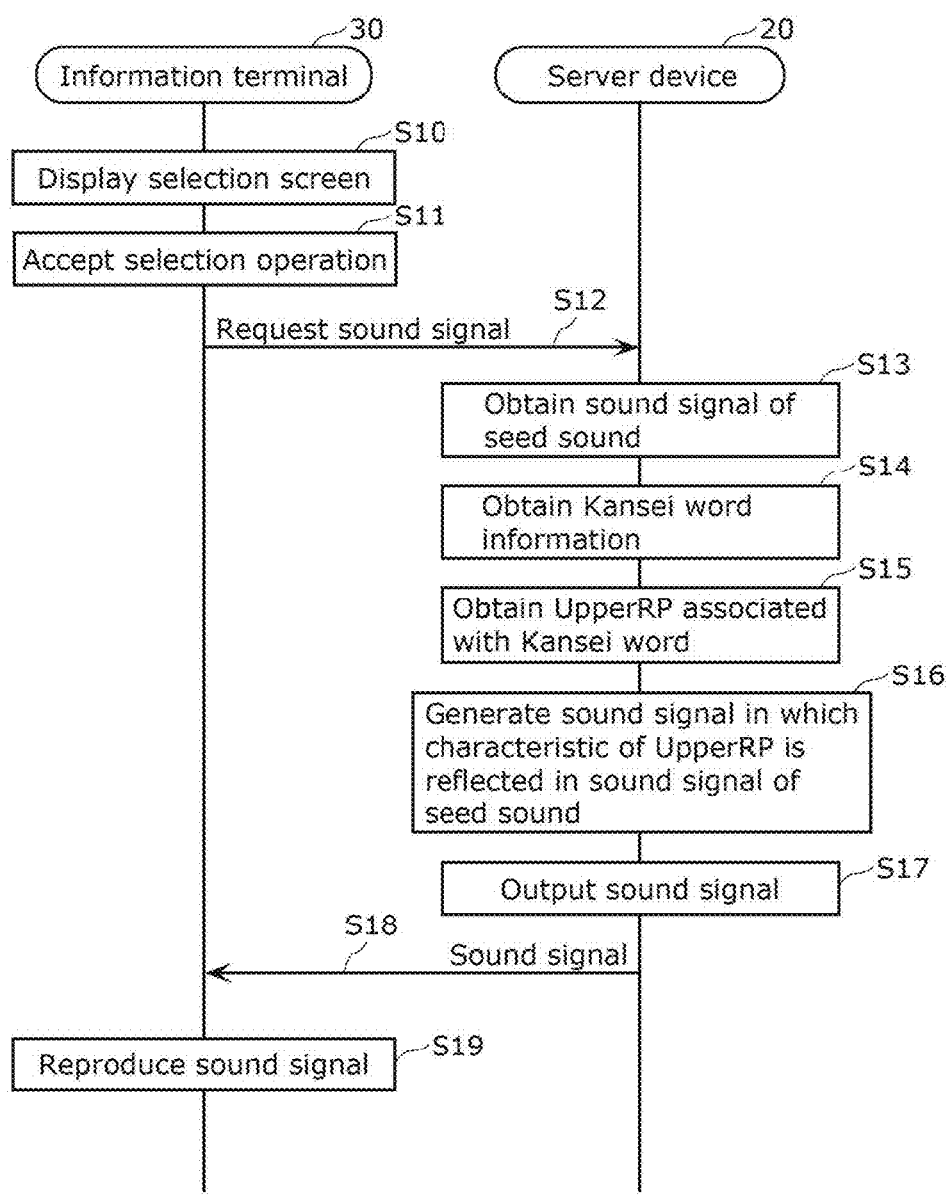
FIG. 7 is a diagram showing sound signals of a seed sound, which are stored in the storage.
FIG. 8 is a sequence diagram showing operation example 1 of a sound signal processing system according to the embodiment.

A sound signal of a seed sound (time waveform) is also stored in storage 23 of server device 20. FIG. 7 is a diagram showing a sound signal of the seed sound, which is to be stored in storage 23.

The seed sound is an example of a second sound, and means a sound (sound source) that is an origin (seed) of the sound to be finally outputted. The seed sound is a nature sound, for example. The duration of the sound signal is relatively short, and is a level of several seconds to ten seconds, for example. The sound signal of the seed sound is provided with a label (identification information), such as "wind sound" and "birdsong".

Operation Example 1

Sound signal processing system 10 can use UpperRP and a sound signal of the seed sound, which are stored in storage 23 of server device 20, to output a sound in which a characteristic indicated by the UpperRP (a characteristic of a certain nature sound from which UpperRP is generated) is reflected in a seed sound desired by a user. Hereinafter, operation example 1 of sound signal processing system 10 as described above is described. FIG. 8 is a sequence diagram showing operation example 1 of sound signal processing system 10.

Figure 9:
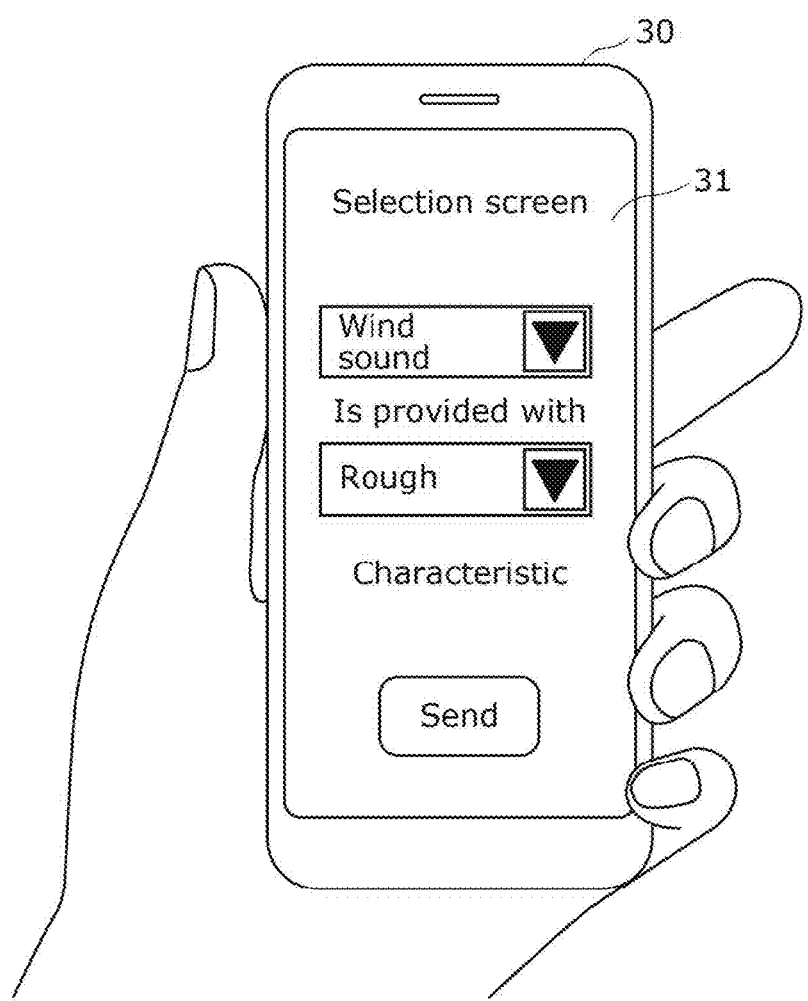
FIG. 9 is a diagram showing an example of a selection screen for selecting the seed sound and a Kansei word (affective term).

First, information processor 33 of information terminal 30 causes UI 31 (display) to display a selection screen for selecting a seed sound and a Kansei word (Step S10). FIG. 9 is a diagram showing an example of the selection screen from which the seed sound and the Kansei word are selected.

While such a selection screen is displayed, a user performs, on UI 31 of information terminal 30, an operation of selecting a desired seed sound and an operation of selecting a desired Kansei word, and UI 31 accepts these operations (Step S11). When these operations are accepted by UI 31, information terminal 30 sends a sound signal request to server device 20 (Step S12). The sound signal request contains seed sound information that indicates the seed sound selected by a user and Kansei word information that indicates the Kansei word selected by the user.

Communicator 21 of server device 20 receives the sound signal request. Second obtainer 25 obtains, from storage 23, a sound signal of the seed sound indicated by the seed sound information (i.e., the seed sound selected by a user) among sound signals of a plurality of seed sounds (FIG. 7), based on the seed sound information contained in the received sound signal request (Step S13).

Third obtainer 26 obtains the Kansei word information contained in the received sound signal request (Step S14). First obtainer 24 obtains, from storage 23, UpperRP (recurrence plot information) associated with a Kansei word indicated by the Kansei word information among a plurality of pieces of UpperRP (FIG. 6), based on the Kansei word information obtained by third obtainer 26 (Step S15).

Generator 27 generates a sound signal in which a characteristic of the sound that is the origin of UpperRP and is obtained by first obtainer 24 is reflected in a sound signal of a seed sound obtained by second obtainer 25, based on the UpperRP obtained by first obtainer 24 (Step S16). A method of generating a sound signal will be described in detail, later.

Outputter 28 outputs the generated sound signal (Step S17). Communicator 21 sends the outputted sound signal to information terminal 30 (Step S18).

Information terminal 30 receives the sound signal. Information processor 33 reproduces the sound signal through speaker 32 (Step S19). As a result, a sound in which the characteristic of the Kansei word selected by a user (more specifically, a characteristic of a nature sound associated with the Kansei word) is reflected in the seed sound desired by the user is outputted from speaker 32.

[Detail of Method of Generating Sound Signal]

Figure 10:
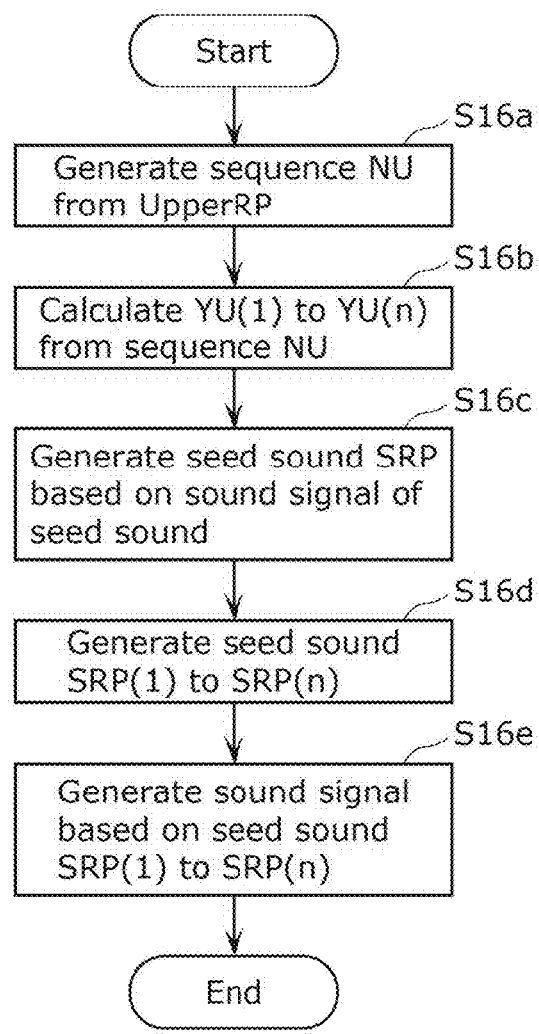
FIG. 10 is a flowchart of a method of generating a sound signal.

Next, a method of generating a sound signal in Step S16 is described in detail. FIG. 10 is a flowchart of a method of generating a sound signal.

First, generator 27 normalizes each element of UpperRP obtained by first obtainer 24 in Step S15 with a maximum value in the UpperRP, and generates sequence NU having (1—the normalized element of the UpperRP) as an element (Step S16a). Sequence NU means a dissimilarity matrix.

Then, generator 27 performs dimensionality contradiction through multidimensional scaling or the like, using sequence NU, to calculate YU(1), YU(2), . . . , and YU(n) that indicate increase/decrease relation of a total value of elements of SRP(1), SRP(2), . . . , and SRP(n) contained in the UpperRP, at the respective time points (Step S16b).

Subsequently, generator 27 generates at least one piece of SRP (hereinafter, it is also referred to as seed sound SRP), based on a sound signal of the seed sound, which is obtained by second obtainer 25 in Step S13 (Step S16c). A method of generating the SRP from a sound signal is the same as the method described above with reference to (a) and (b) of FIG. 5. A single piece of SRP is generated, for example.

Subsequently, generator 27 generates seed sound SRP(1) to SRP(n), based on generated seed sound SRP, as well as YU(1), YU(2), . . . , and YU(n) (Step S16d). Generator 27 recognizes that generated seed sound SRP corresponds to SRP(1) of UpperRP (i.e., generated seed sound SRP is defined as seed sound SRP(1)), for example, and allows each element of seed sound SRP(1) to vary so that the change from seed sound SRP(1) to seed sound SRP(2) follows the change from YU(1) to YU(2), so as to generate seed sound SRP(2).

Various methods can be considered for generating seed sound SRP(2) from seed sound SRP(1) (how change each element of seed sound SRP(1) to follow the change from YU(1) to YU(2)). There may be a method of increasing and decreasing all elements of seed sound SRP(1) in the same manner, and a method of increasing and decreasing only a value of an element at a position where an inclined line exists in seed sound SRP(1), for example. Furthermore, a group of templates of a method of performing increase/decrease from a comfortable sound obtained by the subjective evaluation may be prepared in advance, and increase/decrease may be performed with reference to the prepared group of templates. Generator 27 generates seed sound SRP(3) to SRP(n) in the same manner as for seed sound SRP(2).

Subsequently, generator 27 generates a sound signal, based on generated seed sound SRP(1) to SRP(n) (Step S16e). Generator 27 synthesizes waveforms using, for example, the multidimensional scaling, also for generating a sound signal (waveform synthesis).

First, generator 27 normalizes each element, for each of seed sound SRP(1) to SRP(n), with a maximum value in seed sound SRP, and generates sequence NS(1) to NS(n) having (1—the normalized element of seed sound SRP) as an element. Sequence NS means a dissimilarity matrix.

Then, generator 27 performs dimensionality contradiction through the multidimensional scaling or the like, using sequence NS(1) to NS(n), to calculate YN(1) to YN(n) which are time sequence data of waveforms of sounds of seed sound SRP(1) to SRP (n) at the respective time points. It should be noted that a part corresponding to term T3 (shown in FIG. 5), at which YN and YN that are adjacent to each other overlap, is subjected to fade-in/fade-out processing, averaging processing, and so on for allowing YN and YN adjacent to each other to smoothly connect to each other. As described above, generator 27 can generate a sound signal from seed sound SRP(1) to SRP(n).

Operation Example 2

Figure 11:
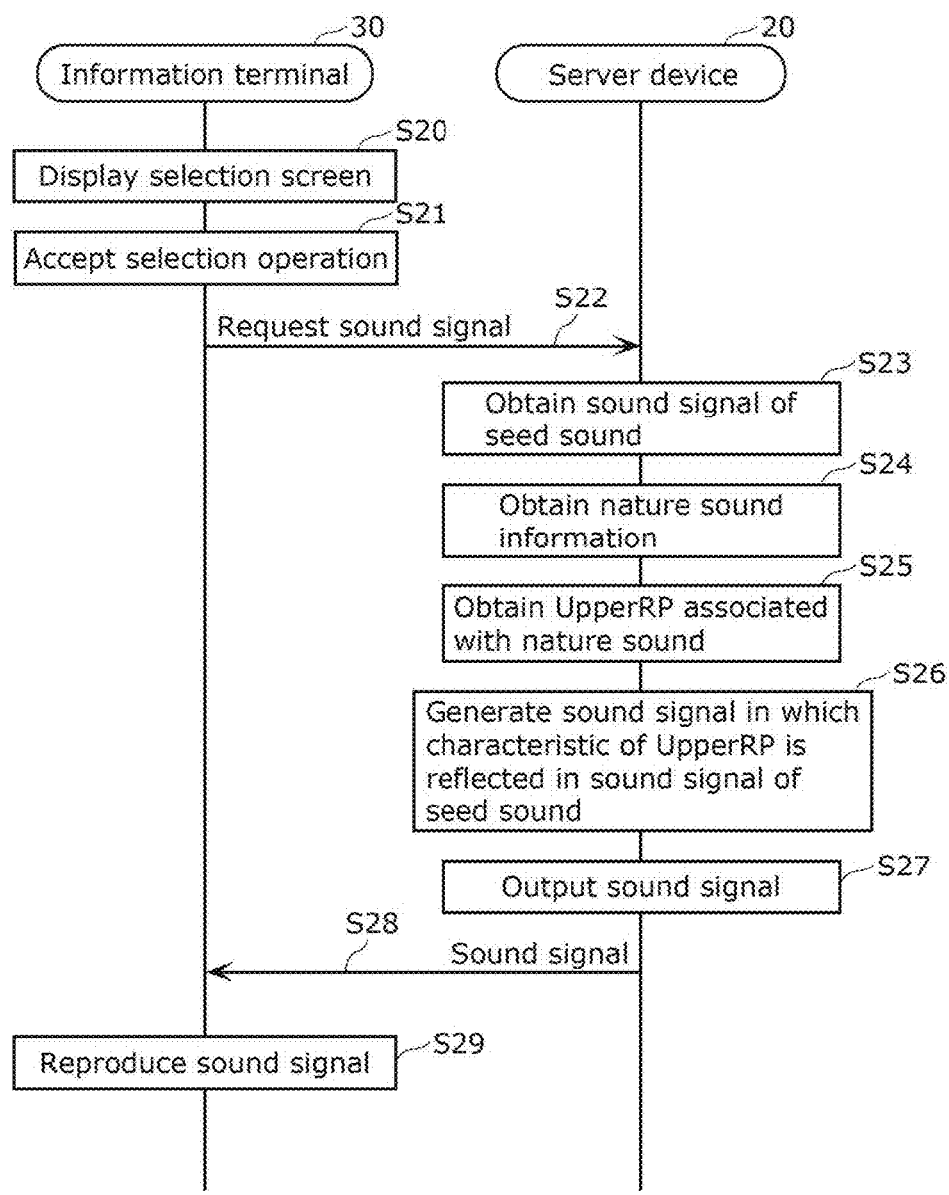
FIG. 11 is a sequence diagram showing operation example 2 of the sound signal processing system according to the embodiment.

Although a user selects a seed sound (a desired nature sound) and a Kansei word in operation example 1, the user may select a seed sound and a nature sound having a characteristic that the user wishes to provide to the seed sound. As shown in FIG. 6, if a nature sound from which UpperRP is originated is labelled to each of a plurality of pieces of UpperRP, a user can select the nature sound from which the UpperRP is originated, instead of a Kansei word. FIG. 11 is a sequence diagram showing operation example 2 of sound signal processing system 10.

Figure 12:
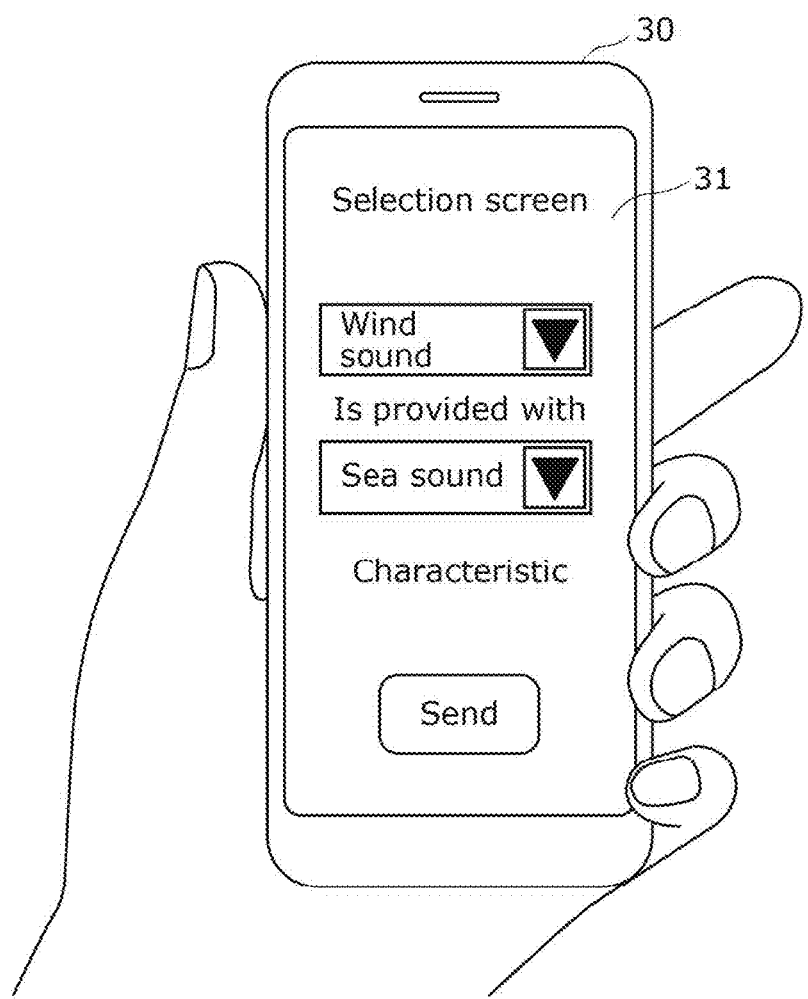
FIG. 12 is a diagram showing an example of a selection screen for selecting the seed sound and the nature sound that has a characteristic desired to be provided to the seed sound.

First, information processor 33 of information terminal 30 causes UI 31 (display) to display a selection screen for selecting a seed sound and a nature sound having a characteristic that is intended to be provided to the seed sound (Step S20). FIG. 12 is a diagram showing an example of the selection screen from which a seed sound and a nature sound having a characteristic to be provided to the seed sound are selected. In operation example 2, there is no need to associate each of a plurality of pieces of UpperRP with a Kansei word.

While such a selection screen is displayed, a user performs, on UI 31, an operation of selecting a desired seed sound and an operation of selecting a desired Kansei word, and UI 31 accepts these operations (Step S21). When these operations are accepted by UI 31, information terminal 30 sends a sound signal request to server device 20 (Step S22). The sound signal request includes seed sound information that indicates the seed sound selected by a user and nature sound information that indicates the nature sound selected by the user.

Communicator 21 of server device 20 receives the sound signal request. Second obtainer 25 obtains, from storage 23, a sound signal of a seed sound indicated by the seed sound information (i.e., the seed sound selected by a user) among a plurality of sound signals of the seed sound (FIG. 7), based on the seed sound information contained in the received sound signal request (Step S23).

Third obtainer 26 obtains nature sound information contained in the received the sound signal request (Step S24). First obtainer 24 obtains, from storage 23, UpperRP (recurrence plot information) associated with the nature sound indicated by the nature sound information among a plurality of pieces of UpperRP (FIG. 6), based on the nature sound information obtained by third obtainer 26 (Step S25).

Generator 27 generates a sound signal in which a characteristic of a sound of the UpperRP obtained by first obtainer 24 is reflected in a sound signal of a seed sound, which is obtained by second obtainer 25, based on the UpperRP obtained by first obtainer 24 (Step S26).

Outputter 28 outputs the generated sound signal (Step S27). Communicator 21 sends the outputted sound signal to information terminal 30 (Step S28).

Information terminal 30 receives a sound signal. Information processor 33 causes speaker 32 to reproduce the sound signal (Step S29). As a result, a sound in which the characteristic (property) of the nature sound selected by a user is reflected in the seed sound desired by the user is outputted from speaker 32.

[Variation]

Although the seed sound is a nature sound in the embodiments above, the seed sound may be artificial sound (a musical piece, electronic sound, or the like), and may include both the nature sound and the artificial sound. Although the sound from which a plurality of pieces of UpperRP are originated is a nature sound in the embodiments above, the sound may be an artificial sound, and may include both the nature sound and the artificial sound. In addition, it is not necessary that the seed sound and the sound from which a plurality of pieces of UpperRP are originated are the same type of sound. For example, the seed sound may be a nature sound, and a sound from which a plurality of pieces of UpperRP are originated may be an artificial sound.

Furthermore, in the above embodiments, the UpperRP is used as the recurrence plot information. In other words, the recurrence plot information is generated by a two-layered hierarchal recurrence plot. However, the recurrence plot information may be generated by a one-layered recurrence plot (in other words, a non-layered recurrence plot), or may be generated by a multi-layered recurrence plot having two or more layers.

[Effects and so On]

As described above, sound signal processing system 10 includes: first obtainer 24 that obtains recurrence plot information indicating a characteristic of a first sound; second obtainer 25 that obtains a sound signal of a second sound different from the first sound; generator 27 that generates a sound signal in which the characteristic of the first sound is reflected in the sound signal of the second sound, based on the recurrence plot information obtained by first obtainer 24, the sound signal of the second sound being obtained by second obtainer 25; and outputter 28 that outputs the generated sound signal. In the above embodiments, the recurrence plot information is UpperRP, and the first sound is a sound from which the UpperRP is originated, and the second sound is a seed sound.

Such sound signal processing system 10 can output a sound signal of new sound in which the characteristic of the first sound is reflected in the second sound, using the recurrence plot information. For example, a method of generating a new music piece using a machine leaning model in which multiple music pieces are learned (see https://openai.com/blog/jukebox/, for example) is known. However, such a method requires enormous quantity of leaned data, so that it takes time to establish a machine leaning model. Furthermore, quantity of information to be processed during generation of a music piece is large. In contrast, sound signal processing system 10 can output a sound signal of new sound, while reducing the quantity of information to be processed by using the recurrence plot information.

In addition, sound signal processing system 10 includes storage 23 in which a plurality of sound signals of the second sound are stored, for example. Second obtainer 25 obtains, from storage 23, a sound signal of the second sound selected by a user, among a plurality of sound signals of the second sound. Storage 23 in this case is an example of the first storage.

Such sound signal processing system 10 can output a sound signal of a new sound in which a characteristic of the first sound is reflected in the second sound that is desired by a user.

In addition, sound signal processing system 10 further includes storage 23 in which a plurality of pieces of the recurrence plot information are stored with each recurrence plot information being associated with a Kansei word, and third obtainer 26 that obtains the Kansei word information indicating the Kansei word designated by a user, for example. First obtainer 24 obtains, from storage 23, recurrence plot information associated with the Kansei word indicated by the Kansei word information obtained by third obtainer 26, among a plurality of pieces of recurrence plot information. Storage 23 in this case is an example of the second storage.

Such sound signal processing system 10 can output a sound signal of a new sound in which a characteristic of the first sound corresponding to the Kansei word desired by a user is reflected in the second sound.

The recurrence plot information is obtained by performing a hierarchal recurrence plot on a sound signal of the first sound, for example.

Such sound signal processing system 10 can output a sound signal of the new sound in which the characteristic of the first sound is reflected in the second sound using the recurrence plot information obtained by performing the hierarchal recurrence plot on the sound signal of the first sound.

The first sound is a nature sound, for example.

Such sound signal processing system 10 can output a sound signal of a new sound in which a characteristic of a certain nature sound different from the second sound is reflected in the second sound.

In addition, the second sound is a nature sound, for example.

Such sound signal processing system 10 can output a sound signal of a new sound in which a characteristic of the first sound is reflected in the nature sound.

Sound signal processing system 10 includes a microcomputer and a memory. The microcomputer, by executing a computer program stored in the memory: obtains recurrence plot information indicating a characteristic of a first sound; obtains a sound signal of a second sound different from the first sound; generates a sound signal in which the characteristic of the first sound is reflected in the obtained sound signal of the second sound, based on the obtained recurrence plot information; and outputs the generated sound signal.

Such sound signal processing system 10 can output a sound signal of a new sound in which the characteristic of the first sound is reflected in the second sound using the recurrence plot information.

A sound signal processing method executed by a computer including sound signal processing system 10 includes: first obtaining step S15 of obtaining recurrence plot information that indicates a characteristic of a first sound; second obtaining step S13 of obtaining a sound signal of a second sound different from the first sound; generating step S16 of generating a sound signal in which the characteristic of the first sound is reflected in the sound signal of the second sound, based on the recurrence plot information obtained in first obtaining step S15, the sound signal of the second sound obtained in second obtaining step S13; and outputting step S17 of outputting the generated sound signal.

According to such a sound signal processing method, a sound signal of a new sound in which a characteristic of the first sound is reflected in the second sound with using the recurrence plot information can be outputted.

OTHER EMBODIMENTS

Embodiments are described as above, but the present disclosure is not limited to the above embodiments.

For example, though the recurrence plot information (UpperRP) is generated based on a sound signal, the recurrence plot information may be generated based on time sequence data other than a sound signal. For example, the recurrence plot information (UpperRP) may be generated based on variable data of a stock price or variable data of an atmospheric temperature.

Although the sound signal processing system is embodied by a plurality of devices in the above embodiment, it may be embodied as a single device. For example, the sound signal processing system may be embodied as a single device corresponding to an information terminal, or may be embodied as a single device corresponding to a server device. If the sound signal processing system is embodied by a plurality of devices, functional components included in the sound signal processing system may be allocated to a plurality of devices in any ways. For example, all or a part of the functional components included in the server device may be provided in the information terminal.

A communication method between the devices in the above embodiment is not particularly limited. If two of the devices perform communication in the above embodiment, a relay device that is not shown may be interposed between the two devices.

The order of the processing described in the above embodiment is an example. The order of a plurality of processing may be changed, or the plurality of processing may be executed in parallel. The processing to be executed by a specified processor may be executed by another processor.

In the above embodiment, each of the components may be embodied by executing software programs respectively suitable for the components. Each of the components may be embodied in a manner that a program executer, such as a CPU and a processor, reads a software program recorded in a recording medium, such as a hard disk and a semiconductor memory, to execute the program.

Each of the components may be embodied by hardware. Each of the components may be a circuit (or an integrated circuit), for example. These circuits may configure a single circuit as a whole, or may be separated circuits. Each of the circuits may be a general circuit, or a dedicated circuit.

A comprehensive or specific embodiment of the present disclosure may be embodied by a system, a device, a method, an integrated circuit, a computer program, or a recording medium including a computer readable CD-ROM. In addition, the embodiment may be embodied by any combination of the system, the device, the method, the integrated circuit, the computer program, and the recording medium. For example, the present disclosure may be embodied as a sound signal processing method executed by a computer, such as a sound signal processing system, or as a program causing a computer to execute such a sound signal processing method. Furthermore, the present disclosure may be embodied as a computer-readable and non-temporal recording medium in which such a program is recorded. It should be noted that the program includes an application program that causes a general information terminal to function as the information terminal according to the above embodiment.

In addition, the present disclosure involves an embodiment obtained by applying various modifications conceivable by a person skilled in the art to each of the embodiments, or an embodiment embodied by combining components and functions in the above embodiments, within a scope without departing from the gist of the present disclosure.

INDUSTRIAL APPLICABILITY

A sound signal processing system according to the present disclosure is useful as a system that can output a sound signal of a new sound in which a characteristic of certain sound is reflected to another sound.

The invention claimed is:

1. A sound signal processing system comprising:
a first obtainer that obtains recurrence plot information indicating a characteristic of a first sound;
a first storage storing sound signals of a plurality of types of second sounds, each of the sound signals of the plurality of types of the second sounds being different from the first sound and being provided with identification information of a sound source of a corresponding second sound;
a second obtainer that obtains, from the first storage, a sound signal of a second sound selected by a user from among the sound signals of the plurality of types of the second sounds;
a generator that generates a sound signal in which the characteristic of the first sound is reflected in the sound signal of the second sound, based on the recurrence plot information obtained by the first obtainer, the sound signal of the second sound being obtained by the second obtainer; and
an outputter that outputs the sound signal generated.

2. The sound signal processing system according to claim 1, further comprising:
a second storage in which a plurality of pieces of recurrence plot information are each stored in association with a Kansei word, the pieces of recurrence plot information each being the recurrence plot information; and
a third obtainer that obtains Kansei word information indicating a Kansei word designated by a user, wherein
the first obtainer obtains, from the second storage, recurrence plot information associated with the Kansei word indicated by the Kansei word information obtained by the third obtainer, among the plurality of pieces of the recurrence plot information.

3. The sound signal processing system according to claim 1, wherein
the recurrence plot information is obtained by performing a hierarchal recurrence plot on the sound signal of the first sound.

4. The sound signal processing system according to claim 1, wherein
the first sound is a nature sound.

5. The sound signal processing system according to claim 1, wherein
the second sound is a nature sound.

6. A sound signal processing system comprising:
a microcomputer; and
a memory, wherein
the microcomputer, by executing a computer program stored in the memory:
obtains recurrence plot information indicating a characteristic of a first sound;
obtains a sound signal of a second sound selected by a user from among sound signals of a plurality of types of second sounds that are stored in the memory and each of which differs from the first sound and is provided with identification information of a sound source of a corresponding second sound;

generates a sound signal in which the characteristic of the first sound is reflected in the sound signal of the second sound obtained, based on the recurrence plot information obtained; and outputs the sound signal generated.

7. A sound signal processing method comprising:

obtaining recurrence plot information indicating a characteristic of a first sound;

obtaining a sound signal of a second sound selected by a user referring to a storage storing sound signals of a plurality types of second sounds each of which differs from the first sound and is provided with identification information of a sound source of a corresponding second sound;

generating a sound signal in which the characteristic of the first sound is reflected in the sound signal of the second sound, based on the recurrence plot information obtained in the obtaining of the recurrence plot information, the sound signal of the second sound being obtained in the obtaining of the sound signal of the second sound; and outputting the sound signal generated.

8. A non-transitory computer-readable recording medium having a program recorded thereon for causing a computer to execute the sound signal processing method according to claim 7.

* * * * *